Aug. 5, 1924.
O. EPPENSTEIN
TELEMETER
Filed Aug. 13, 1921
1,503,752
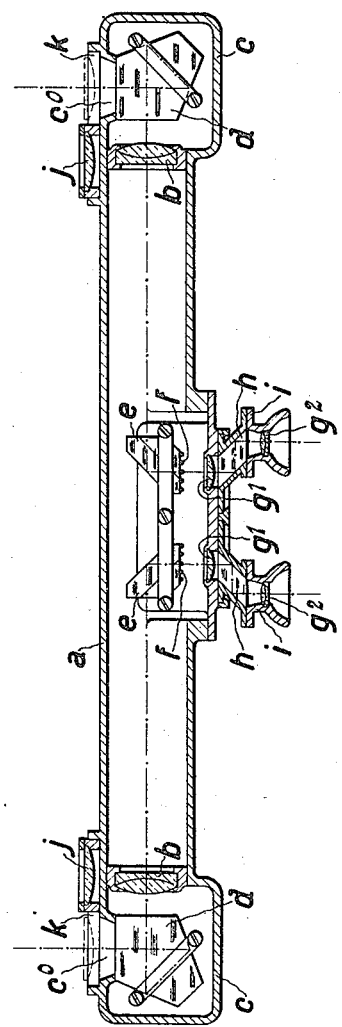
Inventor:
Otto Eppenstein Patented Aug. 5, 1924.

1,503,752

UNITED STATES PATENT OFFICE.

OTTO EPPENSTEIN, OF JENA, GERMANY, ASSIGNOR TO THE FIRM CARL ZEISS, OF JENA, GERMANY.

TELEMETER.

Application filed August 13, 1921. Serial No. 492,103.

(GRANTED UNDER THE PROVISIONS OF THE ACT OF MARCH 3, 1921 41 STAT. L., 1313.)

*To all whom it may concern:*

Be it known that I, OTTO EPPENSTEIN, a citizen of the German Empire, residing at Jena, Germany, have invented a new and useful Telemeter (for which I have filed an application in Germany January 13, 1917, Patent No. 298,535; in Austria April 8, 1918; and in Spain March 2, 1921), of which the following is a specification.

The present invention relates to a telemeter, consisting of two telescopes for the simultaneous (monocular or binocular) observation of the two images presented by the telescopes, with which telemeter a detachable collective (spherical or cylindric) lens is disposed in each of the two telescopes in front of the ocular-prism system (allowing of the simultaneous observation). With the ordinary use of the telemeter these lenses are made inoperative and (as it has been known by the English patent specification 22,102 of the year 1908) they are made operative, if it be desired, to test the telemeter with regard to the correctness of its indications by observing with it a pair of marks set up near the telemeter, the distance apart of these marks being almost equal to the base-line of the telemeter and their connecting line being parallel to the said base-line, and by ascertaining whether, when carrying out the measurement with regard to the object to be measured, replaced by the said two marks, of an infinitely long distance, the telemeter then actually indicates the distance "infinite". The lenses, when made operative, cause the two images of the one and the other mark, produced by the objectives of the instrument, to lie each in the focal plane of the appertaining objective, i. e. in the plane containing the separating line or the measuring marks arranged within the instrument, whilst the said images, when the lenses are made inoperative (owing to the comparatively short distance of the marks disposed in front of the telemeter) would lie each considerably behind the focal plane of the respective objective.

According to the invention the said lenses are disposed each in front of the objective reflecting system of the respective telescope. Under these circumstances any possible curvature of the telemeter in the measuring plane (which may, e. g. be brought about by a change of temperature) does not affect the relative position of the images of the appertaining mark, presented to the telemeter by the two lenses each, whereas such an influence of a curvature generally takes place, if the lenses be disposed behind the objective reflecting system Also with the lenses being disposed behind the objective reflecting systems the said influence may become harmless, in case the lenses are disposed each in the vicinity of the respective objective reflecting system.

The drawing shows as a constructional example a stereoscopic telemeter, corresponding to the invention.

At the ends of a casing $a$ two objectives $b$ are disposed. To the two ends of the casing $a$ two head pieces $c$ are attached which contain a pentagonal prism $d$ each.

The ocular-prism system is composed of two roof-edge shaped prisms $e$; the exit surface of each of the said two prisms lies in the focal plane of the appertaining objective. Each of the exit surfaces is provided with marks $f$, which produce with binocular observation the stereoscopic scale, serving for the measurements. Each of the two oculars of the telemeter consists of a field-lens $g^1$ and of an eye lens $g^2$; between these two lenses a double-reflecting prism $h$ of a rhombic cross-section is disposed. The field-lenses $g^1$ are rigidly fitted within the casing $a$, whilst each of the prisms $h$ together with the appertaining eye lens $g^2$ is disposed in a mount $i$, which, with a view to be able to adapt the distance apart of the axes of inspection of the oculars to the interocular distance of the observer, is rotatable about the axial ray, entering the prism $h$, at the casing of each prism a circular flange being provided for, which is held at the casing $a$ of the telemeter by a plate common to both oculars.

In front of each of the entrance openings $c^0$ of the telemeter a collective lens $j$ is disposed, which is displaceable in a guide $k$. As a rule, the lenses $j$ should be in the position, shown in the drawing by full lines; the lenses $j$ will then be inoperative. If it be desired to test the telemeter in the above mentioned way, the lenses $j$ must be brought into the position, shown in the drawing by dotted lines.

I claim:

1. A telemeter composed of two telescopes, provided each with a collective lens attached in the immediate vicinity of the objective-reflecting system of the respective telescope and being movable in and out of the path of rays.

2. A telemeter composed of two telescopes, provided each with a collective lens attached in front of the objective-reflecting system of the respective telescope and being movable in and out of the path of rays.

OTTO EPPENSTEIN.

Witnesses:
PAUL KRÜGER,
RICHARD HAHN.